United States Patent
Jung et al.

(10) Patent No.: US 9,693,254 B2
(45) Date of Patent: Jun. 27, 2017

(54) METHOD FOR REPORTING DENIED CONNECTION IN WIRELESS COMMUNICATION SYSTEM AND APPARATUS SUPPORTING SAME

(71) Applicant: LG ELECTRONICS INC., Seoul (KR)

(72) Inventors: Sunghoon Jung, Seoul (KR); Youngdae Lee, Seoul (KR); Sungjun Park, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/433,442

(22) PCT Filed: Oct. 2, 2013

(86) PCT No.: PCT/KR2013/008841
§ 371 (c)(1),
(2) Date: Apr. 3, 2015

(87) PCT Pub. No.: WO2014/054890
PCT Pub. Date: Apr. 10, 2014

(65) Prior Publication Data
US 2015/0281991 A1     Oct. 1, 2015

Related U.S. Application Data

(60) Provisional application No. 61/722,792, filed on Nov. 6, 2012, provisional application No. 61/709,941, filed on Oct. 4, 2012.

(51) Int. Cl.
*H04W 4/00* (2009.01)
*H04W 24/10* (2009.01)
(Continued)

(52) U.S. Cl.
CPC .......... *H04W 24/10* (2013.01); *H04W 48/20* (2013.01); *H04W 76/00* (2013.01); *H04W 76/027* (2013.01); *H04W 76/028* (2013.01)

(58) Field of Classification Search
CPC ..... H04W 24/10; H04W 48/20; H04W 76/00; H04W 76/027; H04W 76/028
See application file for complete search history.

(56) References Cited

U.S. PATENT DOCUMENTS

2004/0147266 A1*   7/2004   Hwang ............... H04W 72/005
                                                                                  455/445
2004/0224709 A1*   11/2004   Yi ....................... H04W 76/027
                                                                                   455/515
(Continued)

FOREIGN PATENT DOCUMENTS

EP       2640152 A2    9/2013
EP       2804416 A1    11/2014
(Continued)

OTHER PUBLICATIONS

Amirijoo et al., "On Self-Optimization of the Random Access Procedure in 3G Long Term Evolution," Intl. Symposium on Integrated Network Management—Workshops, XP031504394, Jun. 1, 2009, pp. 177-184.

(Continued)

*Primary Examiner* — Chirag Shah
*Assistant Examiner* — Jael Ulysse
(74) *Attorney, Agent, or Firm* — Birch, Stewart, Kolasch & Birch, LLP

(57) ABSTRACT

Provided is a method for reporting a denied connection in a wireless communication system. The method comprises generating denied connection information, which is information on a connection establishment attempt that is denied, when an attempt to establish the connection to a network is denied, and then reporting the denied connection informa- (Continued)

tion to the network. The denied connection information becomes an operation base for the network.

7 Claims, 12 Drawing Sheets

(51) Int. Cl.
*H04W 76/02* (2009.01)
*H04W 76/00* (2009.01)
*H04W 48/20* (2009.01)

(56) References Cited

U.S. PATENT DOCUMENTS

| | | | | |
|---|---|---|---|---|
| 2008/0039094 | A1* | 2/2008 | Jeong | H04W 76/02 455/436 |
| 2009/0137265 | A1 | 5/2009 | Flore et al. | |
| 2009/0175227 | A1* | 7/2009 | Hyounhee | H04W 28/18 370/329 |
| 2010/0035599 | A1* | 2/2010 | Chen | H04W 76/028 455/422.1 |
| 2010/0075670 | A1* | 3/2010 | Wu | H04J 11/0093 455/434 |
| 2010/0081434 | A1* | 4/2010 | Ahluwalia | H04W 60/06 455/435.1 |
| 2010/0099402 | A1* | 4/2010 | Wu | H04W 76/027 455/423 |
| 2010/0124173 | A1 | 5/2010 | Agashe et al. | |
| 2010/0190499 | A1* | 7/2010 | Wu | H04W 36/0066 455/436 |
| 2010/0291939 | A1* | 11/2010 | Jen | H04W 76/028 455/450 |
| 2010/0302950 | A1* | 12/2010 | Zhao | H04L 47/10 370/242 |
| 2011/0117905 | A1* | 5/2011 | Huang | H04W 76/028 455/422.1 |
| 2011/0317552 | A1* | 12/2011 | Lee | H04W 36/0055 370/228 |
| 2012/0069732 | A1 | 3/2012 | Xu et al. | |
| 2012/0082105 | A1* | 4/2012 | Hwang | H04W 76/06 370/329 |
| 2012/0088495 | A1* | 4/2012 | Tsai | H04W 76/027 455/422.1 |
| 2012/0094707 | A1* | 4/2012 | Chen | H04W 76/027 455/517 |
| 2012/0178449 | A1* | 7/2012 | Liao | H04W 60/00 455/435.2 |
| 2012/0275401 | A1* | 11/2012 | Sun | H04W 72/04 370/329 |
| 2012/0276897 | A1* | 11/2012 | Kwon | H04B 1/1027 455/423 |
| 2012/0309404 | A1* | 12/2012 | Suzuki | H04W 24/10 455/450 |
| 2013/0039287 | A1* | 2/2013 | Rayavarapu | H04W 76/048 370/329 |
| 2013/0039339 | A1* | 2/2013 | Rayavarapu | H04W 76/028 370/331 |
| 2013/0044702 | A1* | 2/2013 | Jayaraman | H04W 48/06 370/329 |
| 2013/0237267 | A1 | 9/2013 | Lee et al. | |
| 2013/0259003 | A1 | 10/2013 | Kwon et al. | |
| 2013/0260740 | A1* | 10/2013 | Rayavarapu | H04W 76/046 455/422.1 |
| 2014/0317456 | A1 | 10/2014 | Kim et al. | |

FOREIGN PATENT DOCUMENTS

| | | |
|---|---|---|
| KR | 10-2006-0021505 A | 3/2006 |
| KR | 10-2006-0034556 A | 4/2006 |
| KR | 10-2010-0093087 A | 8/2010 |
| KR | 10-2011-0089351 A | 8/2011 |
| KR | 10-2012-0067937 A | 6/2012 |
| WO | WO 2010/107358 A1 | 9/2010 |
| WO | WO 2012/064076 A2 | 5/2012 |
| WO | WO 2013/105790 A1 | 7/2013 |

OTHER PUBLICATIONS

Chen et al., "Handling Normal Operation Congestion in M2M Networks," IEEE C802.16p-11/0198r1, XP017780915, Jul. 10, 2011, pp. 1-5.

\* cited by examiner

METHOD FOR REPORTING DENIED CONNECTION IN WIRELESS COMMUNICATION SYSTEM AND APPARATUS SUPPORTING SAME

CROSS REFERENCE TO RELATED APPLICATIONS

This application is the National Phase of PCT International Application No. PCT/KR2013/008841, filed on Oct. 2, 2013, which claims priority under 35 U.S.C. 119(e) to U.S. Provisional Application Nos. 61/709,941, filed on Oct. 4, 2012, and 61/722,792 filed on Nov. 6, 2012, all of which are hereby expressly incorporated by reference into the present application.

BACKGROUND OF THE INVENTION

Field of the Invention

The present invention relates to wireless communication, and more particularly, to a method for reporting rejected connection information performed by a user equipment (UE) in a wireless communication system and an apparatus supporting the same.

Discussion of the Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

A UE needs to establish connection with a network before receiving a service in order to receive the service. To this end, the UE requests the connection establishment and when the request is permitted, the UE enters a connection state to receive the service from the network. The network may approve or deny the connection establishment request of the UE according to a current environment. When the UE cannot be appropriate to a network which the UE intends to establish the current connection or a current communication environment is complicated, and as a result, a normal service cannot be provided, the network may deny the request of the UE.

Since the network cannot know information on the UE, that is, a connection establishment attempt of the UE and information associated with a redenial thereof, the connection establishment attempt of the UE which the attempt has been already denied may be continuously denied. As such, when the network continuously denies the connection establishment attempt of the terminal, service quality for the corresponding UE may remarkably deteriorate.

In order to alleviate such a problem, a method is required, in which the information associated with the connection establishment attempt/denial of the UE is provided to the network, and as a result, the network may be operated by reflecting the information.

SUMMARY OF THE INVENTION

The present invention has been made in an effort to provide a method for reporting rejected connection information performed by a UE in a wireless communication system and an apparatus supporting the same.

In an aspect, a method for reporting rejected connection information in a wireless communication system is provided. The method comprises generating rejected connection information, which is information on a connection establishment attempt that is denied, when an attempt to establish the connection to a network and reporting the rejected connection information to the network. The rejected connection information becomes an operation base for the network.

The rejected connection information may be included in a radio resource control (RRC) connection request message transmitted when the UE requests connection establishment again is transmitted.

The rejected connection information may be reported to the network after connection establishment between the UE and the network is completed.

The rejected connection information may include information indicating a value of a rejected connection counter indicating the number of times when the connection establishment attempt of the UE to the network is denied.

The method may further comprises resetting the rejected connection counter when the connection establishment between the UE and the network is completed The rejected connection information may include information indicating a value of a rejected connection timer indicating a time elapsed from the time when the connection establishment attempt is denied.

The rejected connection timer may be started when the connection establishment attempt is denied and reset when the connection between the UE and the network is established.

The generating of the rejected connection information may include encapsulating, in the rejected connection information, rejected connection tolerance information that indicates whether denial of the subsequent connection establishment attempt is tolerated.

When the number of times at which the connection establishment attempt is denied is more than a rejected connection count threshold, the rejected connection tolerance information may be configured to indicate that denial of the subsequent connection establishment attempt is not tolerated.

When a time elapsed from the time when the connection establishment attempt is denied is more than a rejected connection timer threshold, the rejected connection tolerance information may be configured to indicate that the denial of the subsequent connection establishment attempt is not tolerated.

The method may further comprise discarding the reported rejected connection information.

In another aspect, a wireless device that operates in a wireless communication system is provided. The device comprises a radio frequency (RF) unit which transmits or receives a radio signal and a processor which operates in a functional association with the RF unit. The processor is configured to generate rejected connection information, which is information on a connection establishment attempt that is denied, when an attempt to establish the connection to a network, and report the rejected connection information to the network, and the rejected connection information becomes an operation base for the network.

Connection establishment is attempt, but denied UE reports connection establishment denial information to a network. The network can be operated by reflecting connection establishment denial information provided from the UE to determining whether the subsequent connection establishment attempt is denied. Therefore, the connection establishment attempt of a specific UE can be prevented from being continuously denied, and as a result, service quality for the corresponding UE can be improved.

DESCRIPTION OF EXEMPLARY EMBODIMENTS

Figure 1:
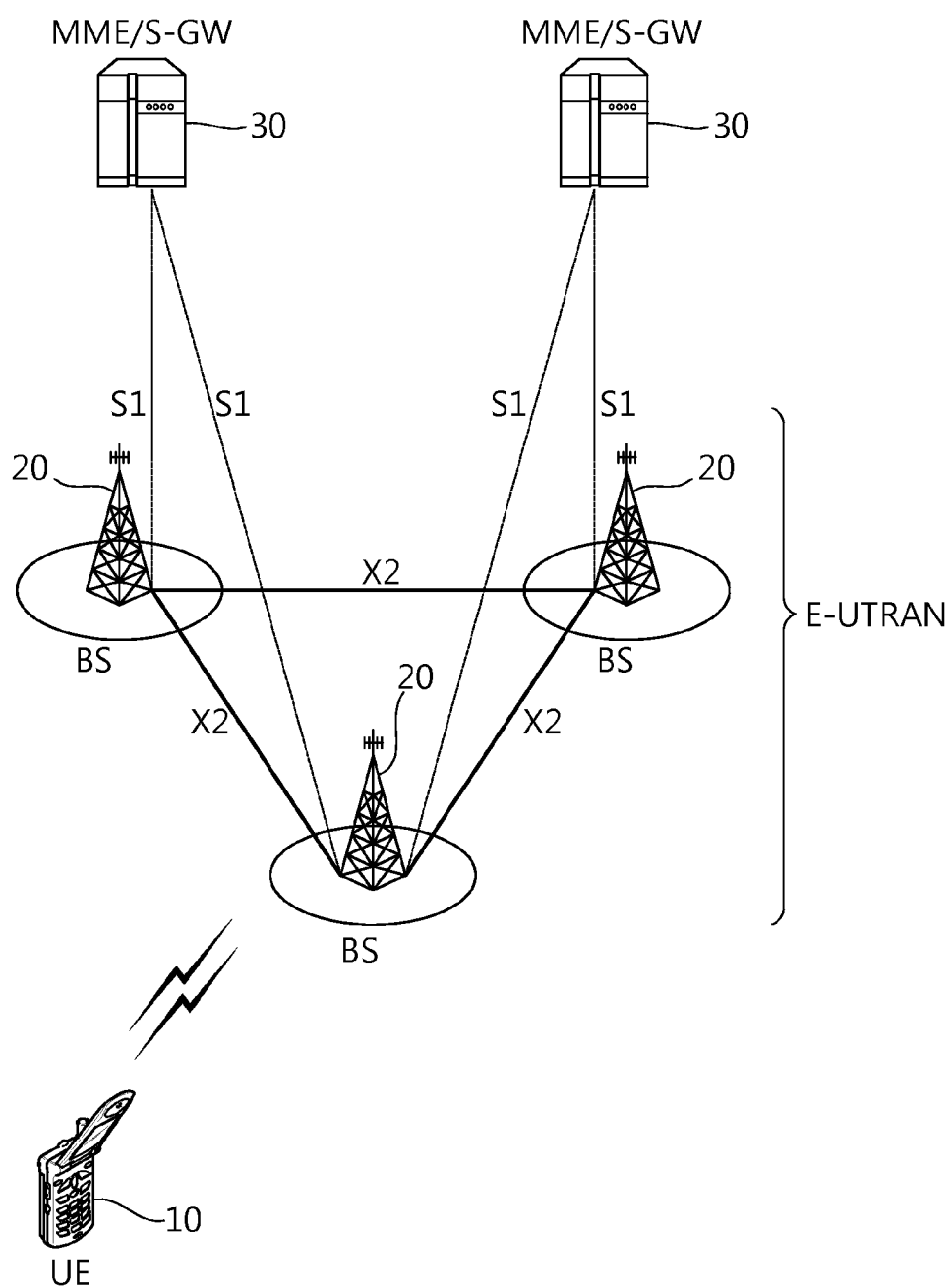
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
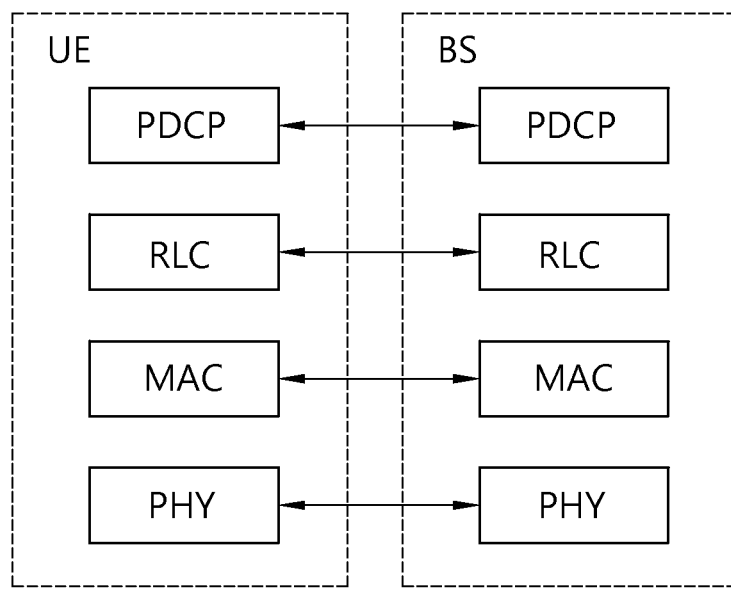
FIG. 2 is a block diagram illustrating a radio protocol architecture for a user plane.
Figure 3:
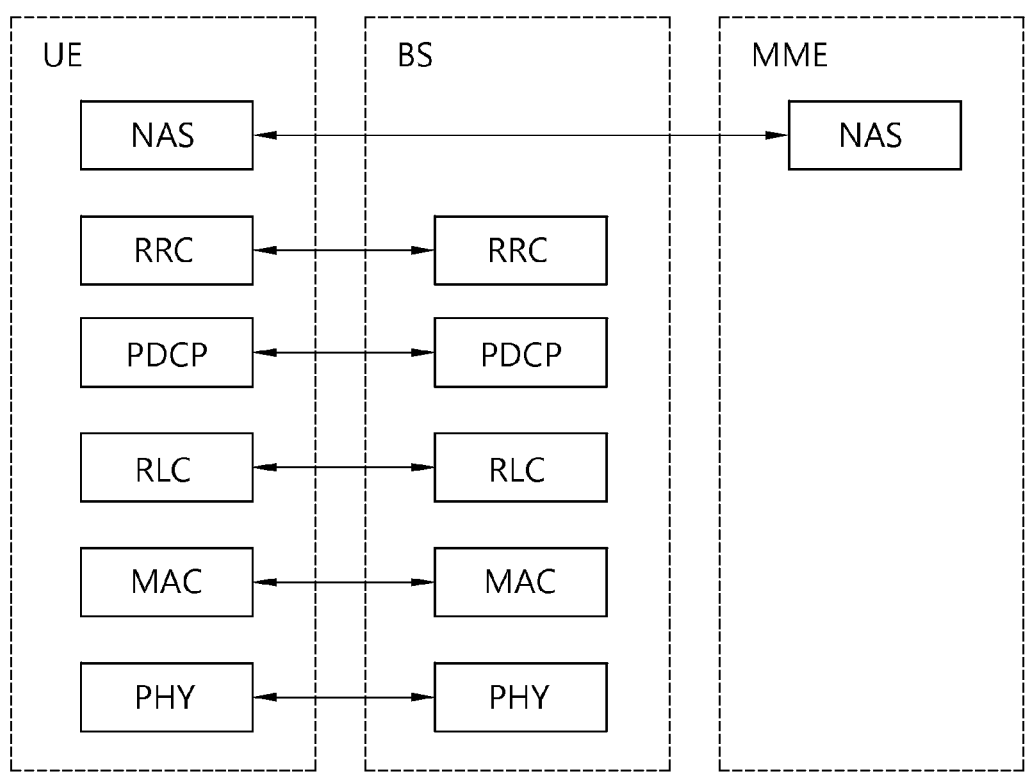
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Next, the system information will be described.

The system information includes necessary information which the UE needs to known so as to be connected to the BS. Accordingly, the UE needs to receive all the system information before being connected to the BS, and further, needs to have latest system information at all times. In addition, since the system information is information to be known by all the UE in one cell, the BS periodically transmits the system information. System information is divided into a master information block (MIB) and a plurality of system information blocks (SIB).

The MIB may include a limited number of parameters required to be obtained for other information from a cell, which are most requisite and are most frequently transmitted. User equipment first finds the MIB after downlink synchronization. The MIB may include information including a downlink channel bandwidth, a PHICH configuration, an SFN that supports synchronization and operates as a timing reference, and an eNB transmission antenna configuration. The MIB may be broadcast-transmitted through a BCH.

System information block type 1 (SIB1) among the included SIBs is transmitted while being included in a message of "SystemInformationBlockType1" and SIBs other than the SIB1 is transmitted while being included in a system information message. Mapping the SIBs to the system information message may be flexibly configured by scheduling information list parameters included in the SIB1. However, each SIB may be included in a single system information message and only SIBs having the same scheduling requirement value (e.g., cycle) may be mapped to the same system information message. Further, system information block type 2 (SIB2) is continuously mapped to a system information message corresponding to a first entry in a system information message list of a scheduling information list. A plurality of system information messages may be transmitted within the same cycle. The SIB1 and all information system information messages are transmitted through a DL-SCH.

In addition to the broadcast transmission, in the E-UTRAN, the SIB1 may be dedicatedly signaled while including a parameter similarly to a value set in the related art and in this case, the SIB1 may be transmitted while being included in an RRC connection reconfiguration message.

The SIB1 includes information associated with a user cell access and defines scheduling of other SIBs. The SIB1 may include PLMN identifiers of the network, a tracking area code (TAC) and a cell ID, a cell barring status indicating whether the cell is a cell which may camp on, a lowest receiving level required in the cell, which is used as a cell reselection reference, and information associated with transmission time and cycle of other SIBs.

The SIB2 may include radio resource configuration information common to all UE. The SIB2 may include information associated with an uplink carrier frequency and an uplink channel bandwidth, an RACH configuration, a paging configuration, an uplink power control configuration, a sounding reference signal configuration, and a PUCCH configuration and a PUSCH configuration supporting ACK/NACK transmission.

The UE may apply acquisition and change sensing procedures of the system information only to a PCell. In an SCell, the E-UTRAN may provide all system information associated with an RRC connection state operation through dedicated signaling when the corresponding SCell is added. When the system information associated with the configured SCell is changed, the E-UTRAN may release and add the considered SCell later and the release and addition may be performed together with the single RRC connection reconfiguration message. The E-UTRAN may configure parameter values other than a value broadcasted in the considered SCell through the dedicated signaling.

The UE needs to guarantee validity of specific type system information and the system information is referred to as required system information. The required system information may be defined as follows.

In the case where the UE is in an RRC idle state: It needs to be guaranteed that the UE has valid versions of the MIB and the SIB1 as well as the SIB2 to SIB8 and this may be followed by supporting a considered RAT.

In the case where the UE is in an RRC connection state: It needs to be guaranteed that the UE has the valid versions of the MIB, the SIB1, and the SIB2.

In general, the validity of the system information may be guaranteed within a maximum of 3 hours after the system information is acquired.

Generally, services provided to the UE by the network may be divided into three types to be described below. Further, the UE differently recognizes the cell type according to which service may be provided. First, the services types will be described below, and then the cell types will be described.

1) Limited service: The service provides an emergency call and an earthquake and tsunami warning system (ETWS), and may be provided in an acceptable cell.

2) Normal service: The service means a public use of a general use, and may be provided in a suitable or normal cell.

3) Operator service: The service means a service for a communication network operator, and the cell may be used by only the communication network operator and may not be used by a general user.

In relation to the service type provided by the cell, the cell types may be divided below.

1) Acceptable cell: A cell in which the UE may receive the limited service. The cell is a cell which is not barred and satisfies a cell selection reference of the UE in the corresponding UE.

2) Suitable cell: A cell in which the UE may receive the normal service. The cell satisfies a condition of the acceptable cell and simultaneously satisfies additional conditions. As the additional conditions, the cell needs to belong to a public land mobile network (PLMN) to which the corresponding UE may be connected and be a cell in which the performance of the tracking area updating procedure of the UE is not barred. When the corresponding cell is a CSG cell, the UE needs to be a cell to be connected to the corresponding cell as the CSG member.

3) Barred cell: The cell is a cell which broadcasts information on a cell barred through the system information.

4) Reserved cell: The cell is a cell which broadcasts information on a cell reserved through the system information.

Figure 4:
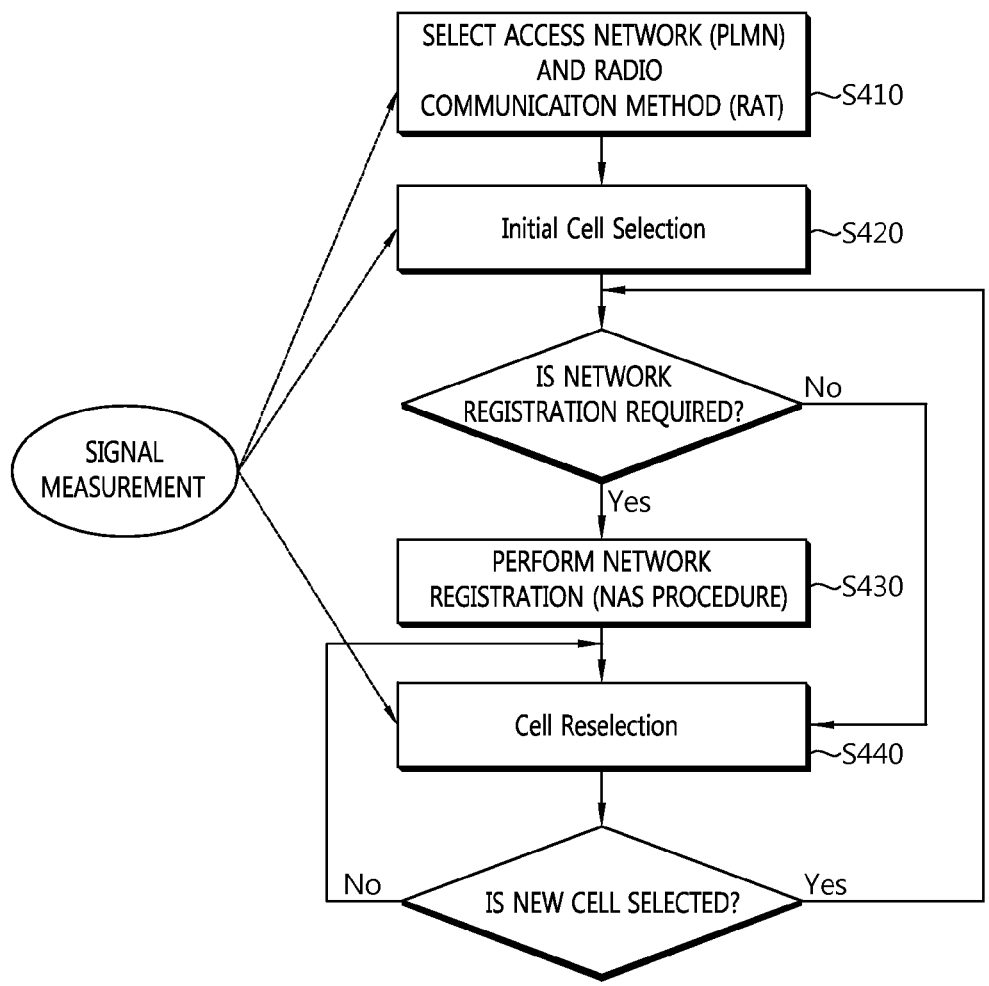
FIG. 4 is a flowchart illustrating an operation of the UE in the RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary.

Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAI)) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
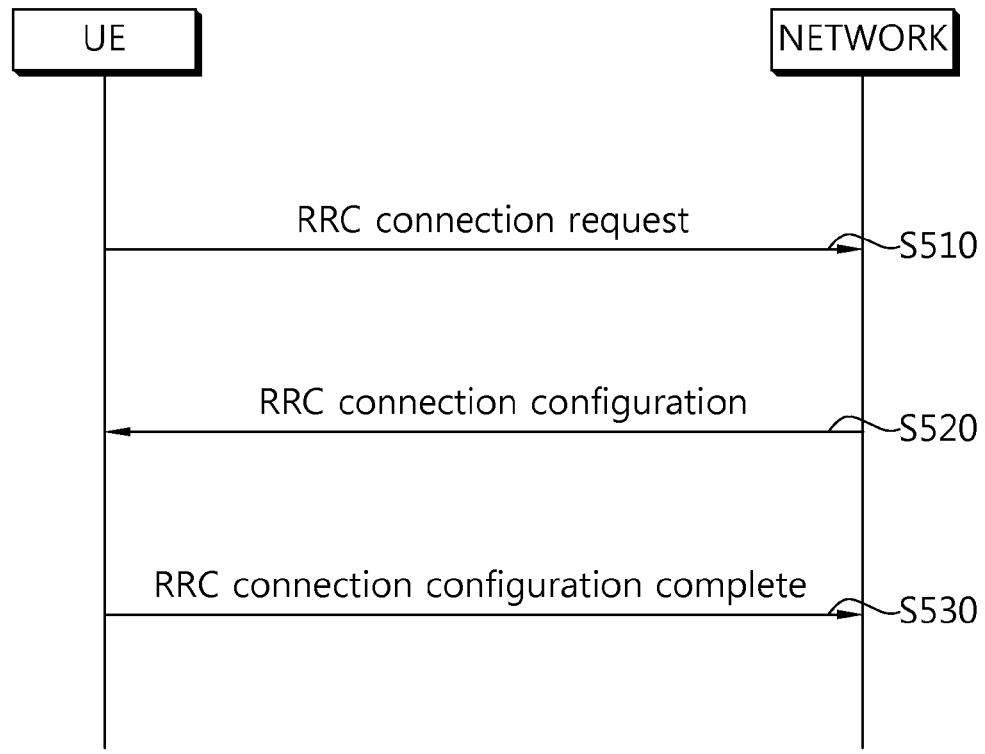
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
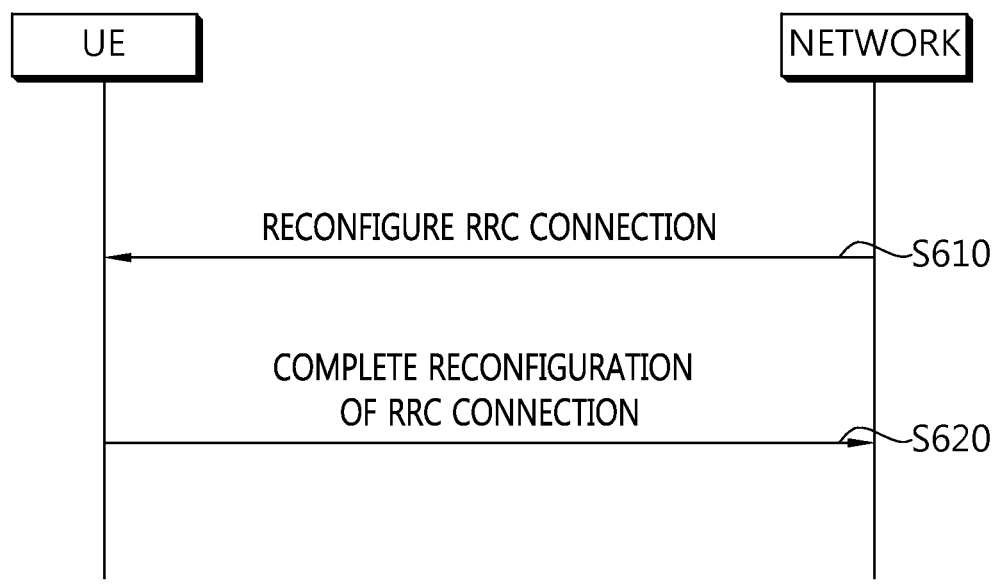
FIG. 6 is a flowchart illustrating an RRC connection reconfiguration process.

FIG. 6 is a flowchart illustrating an RRC connection reconfiguration process. The RRC connection reconfiguration is used for modifying the RRC connection. The RRC connection reconfiguration is used for RB establishment/modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Hereinafter, the PLMN (Public Land Mobile Network) will be described.

The PLMN is a network which is arranged and operated by a mobile network operator. Each mobile network operator operates one or more PLMNs. Each PLMN may be identified as a mobile country code (MCC) and a mobile network code (MNC). PLMN information of the cell is included in the system information to be broadcasted.

In PLMN selection, cell selection, and cell re-selection, various types of PLMNs may be considered by the UE.

Home PLMN (HPLMN): PLMN having a MCC and a MNC matched with the MCC and the MNC of the UE IMSI.

Equivalent HPLMN (EHPLMN): PLMN handled to be equivalent to the HPLMN.

Registered PLMN (RPLMN): PLMN in which position registration is successfully completed.

Equivalent PLMN (EPLMN): PLMN handled to be equivalent to the RPLMN.

Each mobile service consumer is subscribed in the HPLMN. When a general service is provided to the UE by the HPLMN or the EHPLMN, the UE is not in a roaming state. On the other hand, when the service is provided to the UE by a PLMN other than the HPLMN/EHPLMN, the UE is in the roaming state, and the PLMN is called a visited PLMN (VPLMN).

The UE searches a usable PLMN and selects a suitable PLMN which may receive the service when the power is turned on in an initial stage. The PLMN is a network which is deployed or operated by a mobile network operator. Each mobile network operator operates one or more PLMNs. Each PLMN may be identified by a mobile country code (MCC) and a mobile network code (MNC). PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identity to which the TA belongs and a tracking area code (TAC) uniquely expressing the TA in the PLMN.

Next, among the cells provided by the selected PLMN, the UE selects a cell having signal quality and characteristic which may receive a suitable service.

Next, a procedure of selecting the cell by the UE will be described in detail.

When the power is turned on or the UE stays in the cell, the UE performs procedures for receiving the service by selecting/re-selecting a cell having proper quality.

The UE in the RRC idle state selects the cell having the proper quality at all times and needs to be prepared to receive the service through the selected cell. For example, the UE in which the power is just turned on needs to select the cell having the proper quality for registration to the network. When the UE in the RRC connection state enters the RRC idle state, the UE needs to select the cell staying in the RRC idle state. As such, a process of selecting the cell which satisfies any condition so that the UE stays in a service stand-by state such as the RRC idle state is called cell selection. Since the cell selection is performed in a state where the cell in which the UE stays in the RRC idle state is not currently determined, it is more important to select the cell as quickly as possible. Accordingly, so long as the cell is a cell providing radio signal quality of a predetermined level or more, even though the cell is not the cell providing the best signal quality to the UE, the cell may be selected in the cell selection process of the UE.

Hereinafter, with reference to 3GPP TS 36.304 V8.5.0 (2009-03) "User Equipment (UE) procedures in idle mode (Release 8)", a method and a procedure of selecting the cell by the UE in 3GPP LTE will be described in detail.

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighbor cell for the cell reselection.

Second, the cell reselection is performed based on a cell reselection reference. The cell reselection reference has the following characteristics in association with the measurement of the serving cell and the neighbor cell.

The intra-frequency cell reselection is basically based on ranking. The ranking is an operation of defining index values for evaluating the cell reselection and ranking cells in an order of sizes of the index values by using the index values. A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through the broadcast signaling or provide a priority for each frequency for every UE through dedicated signal for each UE. The cell reselection priority provided through the broadcast signaling may be referred to as a common priority, and the cell reselection priority set by the network for each UE may be referred to as a dedicated priority. When the UE receives the dedicated priority, the UE may receive a validity time related with the dedicated priority together. When the UE receives the dedicated priority, the UE starts a validity timer set as the validity time received together. The UE applies the dedicated priority in the RRC idle mode while the validity timer operates. When the validity timer ends, the UE discards the dedicated priority and applies the common priority again.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighbor cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

Next, the ranking performed in the cell reselection evaluating process will be described.

A ranking criterion used to give the priority of the cell is defined by Equation 1.

$$R_S = Q_{meas,s} + Q_{hyst}, R_n = Q_{meas,n} - Q_{offset} \qquad \text{[Equation 1]}$$

Here, $R_s$ represents a ranking criterion of the serving cell, $R_n$ represents a ranking criterion of the neighbor cell, $Q_{meas,s}$ represents a quality value measured with respect to the serving cell by the UE, $Q_{meas,n}$ represents a quality value measured with respect to the neighbor cell by the UE, $Q_{hyst}$ represents a hysteresis value for ranking, and $Q_{offset}$ represents an offset between the both cells.

In the intra-frequency, when the UE receives the offset $Q_{offsets,n}$ between the serving cell and the neighbor cell, $Q_{offset} = Q_{offsets,n}$, and when the UE does not receive $Q_{offsets,n}$, $Q_{offset} = 0$.

In the inter-frequency, when the UE receives the offset $Q_{offsets,n}$ for the corresponding cell, $Q_{offset} = Q_{offsets,n} + Q_{frequency}$, and when the UE does not receive $Q_{offsets,n}$, $Q_{offset} = Q_{frequency}$.

When the ranking criterion $R_s$ of the serving cell and the ranking criterion $R_n$ of the neighbor cell are changed in a similar state, the ranking order is frequently reversed as the changing result, and as a result, the UE may alternately reselect the two cells. $Q_{hyst}$ is a parameter for preventing the UE from alternately reselecting the two cells by giving the hysteresis in the cell reselection.

The UE measures the $R_s$ of the serving cell and the $R_n$ of the neighbor cell according to the Equation 1, regards the cell having the largest ranking criterion value as the highest ranked cell, and selects the cell.

According to the reference, it can be seen that the quality of the cell acts as the most important reference in the cell reselection. When the reselected cell is not the suitable cell, the UE excludes the corresponding frequency or the corresponding cell from the cell reselection target.

Hereinafter, a radio link failure (RLF) will be described.

The UE continuously performs the measurement in order to maintain the quality of the radio link with the serving cell receiving the service. The UE determines whether the communication is impossible in the current situation due to deterioration of the quality of the radio link. When the communication is almost impossible due to the low quality of the serving cell, the UE determines the current situation as a radio link failure.

When the radio link failure is determined, the UE gives up the communication maintenance with the current serving cell, selects a new cell through the cell selection (or cell reselection) procedure, and attempts the RRC connection re-establishment to the new cell.

In a specification of 3GPP LTE, cases where the normal communication is impossible are exemplified below:

a case where the UE determines that there is a serious problem in the downlink communication link quality based on the radio quality measuring result of the PHY layer (determines that the quality of the PCell is low during the RLM.

a case where the UE determines that there is a problem in the uplink transmission when a random access procedure is continuously failed in a MAC sub-layer.

a case where the UE determines that there is a problem in the uplink transmission when uplink data transmission is continuously failed in an RLC sub-layer.

a case where the UE determines that the handover is failed.

a case where a massage received by the UE does not pass through an integrity check.

Hereinafter, the RRC connection re-establishment procedure will be described in more detail.

Figure 7:
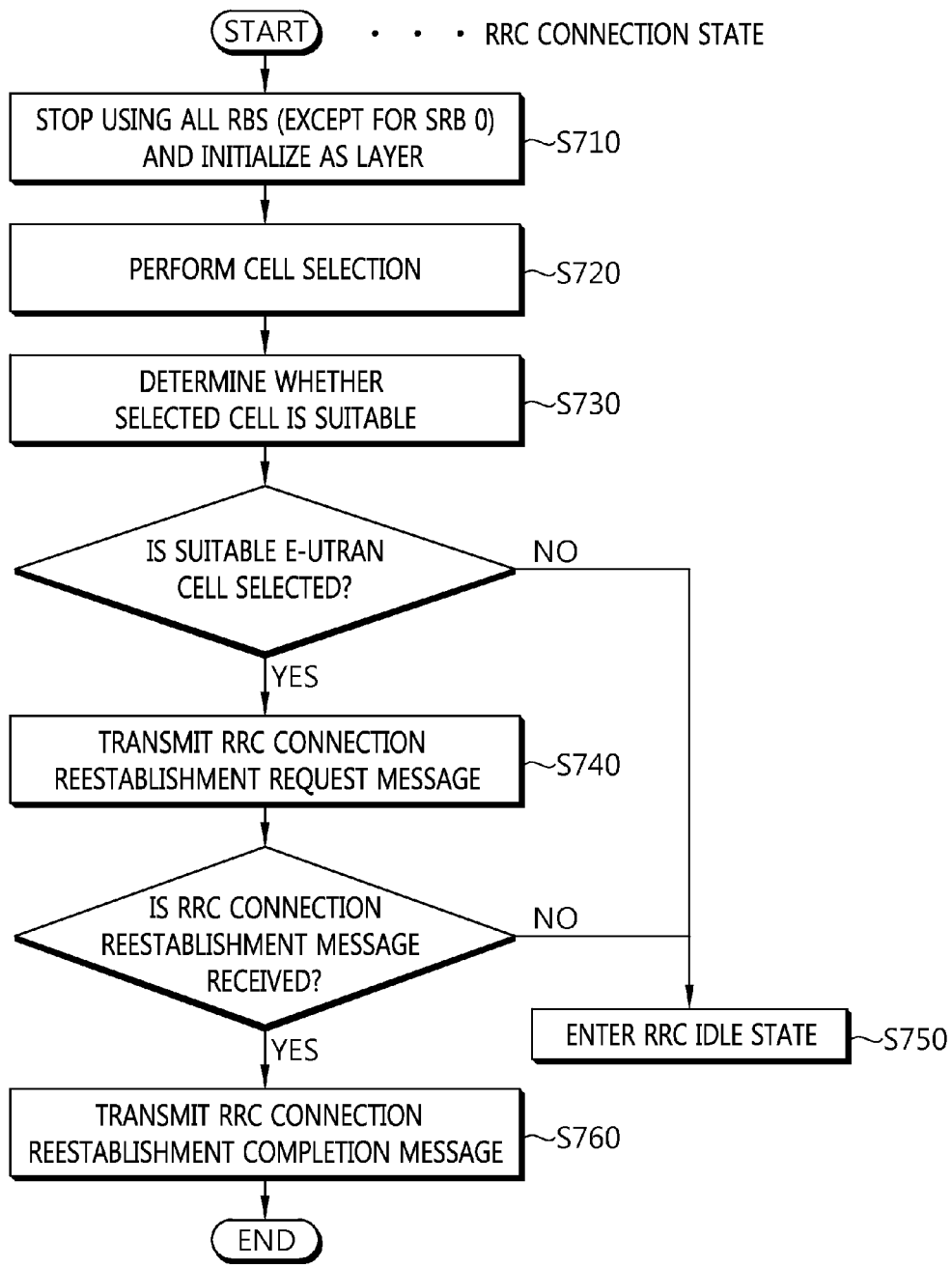
FIG. 7 is a diagram illustrating a RRC connection re-establishment procedure.

FIG. 7 is a diagram illustrating a RRC connection re-establishment procedure.

Referring to FIG. 7, the UE stops the used of all radio bearers which have been set except for signaling radio bearer #0 (SRB 0) and initializes each sub-layer of the AS (S710). Further, each sub-layer and the PHY layer are set as a default configuration. The UE maintains the RRC connection state during such a process.

The UE performs a cell selection procedure for performing the RRC connection reconfiguration procedure (S720). The cell selection procedure in the RRC connection reconfiguration procedure may be performed the same as the cell selection procedure performed in the RRC idle state of the UE even though the UE maintains the RRC connection state.

The UE verifies the system information of the corresponding cell to determine whether the corresponding cell is a suitable cell or not, after performing the cell selection procedure (S730). When it is determined that the selected cell is the suitable E-UTRAN cell, the UE transmits an RRC connection reestablishment request message to the corresponding cell (S740).

Meanwhile, when it is determined that the cell selected through the cell selection procedure for performing the RRC connection reestablishment procedure is the cell using the RAT other than the E-UTRAN, the UE stops the RRC connection reestablishment procedure and enters the RRC idle state (S750).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE.

The UE receiving the RRC connection reestablishment message from the cell reconfigures the PDCP sub-layer and the RLC sub-layer for the SRB1. Further, the UE calculates various key values related with security setting and reconfigures the PDCP sub-layer responsible for the security with newly calculated security key values. As a result, the SRB 1 between the UE and the cell is opened, and the RRC control message may be transmitted and received. The UE completes the restarting of the SRB1, and transmits to the cell an RRC connection reestablishment complete message that the RRC connection reestablishment procedure is completed (S760).

On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Hereinafter, an operation of the UE and the network associated with RRC connection denial will be described. In the RRC connection establishment procedure, when the network transmits an RRC connection denial message to the UE in response to an RRC connection request message, the network does not permit the UE to access the corresponding cell and/or the RAT of the corresponding cell according to a current network situation. To this end, the network may encapsulate in the RRC connection denial message information associated with a cell reselection priority and/or access limit information for limiting cell access so as to stop the UE from accessing the network.

The network may encapsulate in the RRC reject connection message lowest priority request information indicating that a lowest priority is to be applied when the UE performs the cell reselection. The lowest priority request information may include lowest priority type information indicating a type to which the lowest priority is applied and lowest priority timer information which is application duration of the lowest priority. The lowest priority type information may be configured to instruct the lowest priority to be applied to a frequency of a cell that transmits the RRC connection denial message or the lowest priority to be applied to all frequencies of the RAT of the corresponding cell.

When the UE receives the RRC connection denial message including the lowest priority request information, the UE starts a timer set as the lowest priority application duration and applies the lowest priority to a target indicated by the lowest priority type information to perform the cell reselection.

Meanwhile, when the lowest priority information is provided through the RRC connection denial message, the lowest priority information may collide with a reselection priority signaled by the network. In this case, the UE may be implemented to be operated by preferentially applying the lowest priority to a specific frequency according to the lowest priority information provided through the RRC connection denial message. Additionally, the lowest priority information depending on the RRC connection denial message may collide with application of an implicit priority depending on a UE-originated indication like a multimedia broadcast multicast service (MBMS) interest indication, a closed subscriber group (CSG) cell associated proxy indication, and an IDC interference associated IDC indication. As a result, the priority to be preferentially applied may follow the implementation of the UE or the network.

The network may encapsulate wait time information in the RRC connection denial message in order to limit access of the UE to the network. The UE that receives the RRC connection denial message including the wait time information may set a wait timer as long as the indicated duration and start the wait timer. While the wait timer is driven, the UE may not perform the RRC connection establishment procedure for accessing the network.

The network may encapsulate extended wait time information in the RRC connection denial message for delay tolerant UE which is UE more adaptive to a delayed service. The extended wait time information may be implemented to indicate an extended wait duration value longer than a value of the wait time information. The UE may access the network based on the extracted wait time information when extended wait time information is included in the RRC connection denial message and the corresponding UE is the delay tolerant UE. On the contrary, when the UE is not the delay tolerant UE, the UE may access the network based on the wait time information.

The UE that intends to attempt the connection establishment has attempted the connection establishment lately, but the network may distinguish whether the corresponding UE is a UE which is denied or a UE which is not denied. In the case where the UE that has attempted the connection establishment to the network lately attempts the connection establishment to the network again, when the UE is denied from the network again, a service start of the UE is delayed. Accordingly, a method is required to be proposed, in which information associated with connection denial is reported to the network and the network is to be operated based on the information, in order to prevent the service start for the UE from being continuously delayed due to denial the continuous connection establishment attempt.

Figure 8:
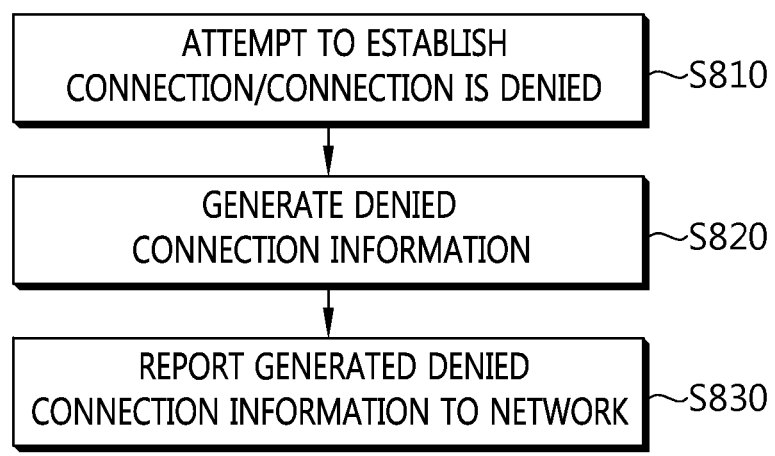
FIG. 8 is a diagram illustrating a method for reporting rejected connection information according to an exemplary embodiment of the present invention.

FIG. 8 is a diagram illustrating a method for reporting rejected connection information according to an exemplary embodiment of the present invention.

Referring to FIG. 8, the UE attempts the connection establishment, but may be denied a connection from the network (S810). When the UE is rejected the connection, the UE transmits an RRC connection request message in order to attempt the connection establishment to the network, but the UE may receive an RRC connection reject message depending on the denial from the network.

As described above, the RRC connection reject message transmitted from the network to the UE in the rejected connection may include wait time information, extended wait time information, and lowest priority request information. The wait time may be a time interval when the connection establishment attempt is excluded with respect to one cell to which the UE transmits the RRC connection reject message. The extended wait time may be a time interval when the connection establishment attempt is excluded regardless of a cell which the delay tolerant UE camps on. The lowest priority request information may be information that requests the UE to perform cell reselection by applying a lowest priority to a specific frequency or all frequencies of a specific RAT. The UE may perform the cell reselection based on the information arranged as above and attempt the connection establishment to a selected target cell.

When the rejected connection occurs, the UE generates rejected connection information (S820). The rejected connection information may include information associated with the connection establishment attempt denied by the network and implementation of detailed information will be described below in detail.

1) Rejected Connection Counter

The rejected connection counter may be configured to indicate a rejected connection count from the network even though the UE attempts the connection establishment. The denial count of the connection establishment attempt may be implemented as the denial count with a fixed specific time or a specific time set by the network. The denial count of the connection establishment attempt may be implemented as the denial count of the connection establishment attempt counted after the RRC connection with the network is released, that is, from the time when the UE enters an RRC idle state. When the UE attempts the connection establishment, but is denied from the network, the rejected connection counter may be increased.

The rejected connection count may be reset when the RRC connection establishment with the network is permitted. For example, the connection establishment attempt of the UE is permitted by the network and the UE thus receives an RRC connection configuration message from the network, and as a result, the rejected connection count may be reset.

When an establishment cause in the current RRC connection request message is different from an establishment cause in the RRC connection request message denied by the previous network, counting by the rejected connection counter may be stopped.

When a currently selected/registered PLMN is different from a PLMN of a cell that denies the connection establishment attempt, the counting by the rejected connection counter may be stopped.

2) Rejected Connection Timer

The rejected connection timer may be configured to indicate a time interval elapsed after the connection establishment attempt of the UE is denied.

The rejected connection timer may be started as the connection establishment attempt is denied by the network. That is, when the UE receives the RRC connection reject message from the network, the UE may start the rejected connection timer.

The rejected connection timer may be reset when the RRC connection establishment with the network is permitted. For example, the connection establishment attempt of the UE is permitted by the network and the UE thus receives the RRC connection configuration message from the network, and as a result, the rejected connection timer may be reset.

When the establishment cause in the current RRC connection request message is different from the establishment cause in the RRC connection request message denied by the previous network, the rejected connection timer may be reset or stopped.

When the currently selected/registered PLMN is different from the PLMN of a cell that denies the connection establishment attempt, the rejected connection timer may be reset or stopped.

3) Rejected Connection Time

The rejected connection time may be configured to indicate the time when the connection establishment attempt by the UE is denied.

4) Rejected Connection Tolerance Information

The rejected connection tolerance information may be configured to indicate whether the connection establishment attempt of the UE may be tolerated to be denied any longer. When the UE is continuously connection-denied, the UE may not tolerate the rejected connection any longer in order to receive the service and in order to notify that the UE may not tolerate the rejected connection any longer to the network, the rejected connection tolerance information may be provided to the network.

The rejected connection tolerance information may be determined based on the rejected connection counter and/or the rejected connection timer. Since the rejected connection counter is information indicating what times the connection establishment attempt by the UE is denied and the rejected connection timer is information indicating a time when the UE may not achieve the RRC connection establishment with the network, the UE may determine whether the denial of the connection establishment attempt is possible or impossible even later based on both information. In more detail, when the rejected connection counter is more than a specific threshold, the rejected connection tolerance information may be configured to indicate that the rejected connection is not tolerated any longer. Alternatively, when the rejected connection timer is more than a specific threshold, the rejected connection tolerance information may be configured to indicate that the rejected connection is not tolerated any longer.

The rejected connection tolerance information may be implemented as an establishment cause which the existing UE may encapsulate in the RRC connection request message and transmit to the network. The UE encapsulates the establishment cause set to a specific value in the rejected connection information and transmits the establishment cause to the network to notify urgency in accessing the network to the network. For example, the establishment cause may be configured to indicate cause values such as the existing emergency, high priority access, mobile terminating (MT), and mobile originating (MO) and may be configured to indicate a specific cause value additionally indicating that the UE does not tolerate the rejected connection any longer for implementation as the rejected connection tolerance information.

5) Establishment Cause for Rejected Connection Establishment Attempt

The establishment cause may be configured to indicate the establishment cause associated with the connection establishment attempt denied by the network. As one example, the establishment cause may be configure as the establishment cause in the RRC connection configuration message transmitted for the connection establishment attempt and denied by the network.

6) Wait Time and/or Extended Wait Time for Rejected Connection

The wait time and/or extended wait time may be configured to indicate the wait time and/or extended wait time included in the RRC connection reject message in the rejected connection for the connection establishment attempt of the UE.

7) Lowest Priority Information

The lowest priority information may be information associated with the lowest priority which the current UE is applying.

The lowest priority information may include at least one frequency list of a specific RAT to which the current UE applies the lowest priority. Further, the lowest priority information may indicate the specific RAT to which the current UE applies the lowest priority.

The lowest priority information may indicate all frequencies of the specific RAT to which the current UE applies the lowest priority. Further, the lowest priority information may indicate the specific RAT to which the current UE applies the lowest priority.

8) Selected PLMN Information

The selected PLMN information may be configured to indicate an identifier of a PLMAN selected when the network denies the connection establishment attempt of the UE.

The UE may include at least one of the various types of information in generating the rejected connection information. What type of information may be included when the UE generates the rejected connection information may be determined according to the size of a message containing the rejected connection information to be transferred. That is, the rejected connection information may be generated differently according to a limit in size of the message transmitted to the network in order for the UE to provide the rejected connection information to the network. For example, when the rejected connection information is transferred to the network with being included in a message limited to have a very small size such as the RRC connection request message, the rejected connection information may be just generated as information having a small size to include only an indicator indicating whether the UE has experienced the rejected connection before.

The UE may make the rejected connection information include information on the multiple numbers of rejected connections in generating the rejected connection information. That is, when the network denies the multiple numbers of connection establishment attempts, the UE logs in the information on each rejected connection to generate the rejected connection information.

Referring back to FIG. 8, the UE reports the generated rejected connection information to the network (S830).

The UE may report the rejected connection information to the network in the subsequent connection establishment attempt. In this case, the UE may transmit the rejected connection information included I the RRC connection request message to the network. In this case, a specific cell that is reported the rejected connection information may vary according to an application operation of the lowest priority by the UE. For example, when the lowest priority is applied to the corresponding cell that denies the previous connection establishment attempt of the UE with denial of the RRC connection, the UE may report the rejected connection information in the connection establishment attempt to other cell on an inter-frequency. As another example, when the lowest priority is applied to an LTE cell that denies the previous connection establishment attempt of the UE with the denial of the RRC connection, the UE may report the rejected connection information in the connection establishment attempt to UTRAN type other cell.

The UE may report the rejected connection information to the network after the connection establishment is completed. In this case, the rejected connection information by the UE may be reported to the network in response to a request for reporting the rejected connection information of the network.

The UE may transmit a rejected connection information indicator to the network in order to allow the network to notify that there is the rejected connection information to be currently reported. The rejected connection information indicator may be included in the RRC connection request message or an RRC connection configuration completion message. The rejected connection information indicator may indicate whether the UE has the rejected connection information to be reported. When the network acquires the rejected connection information indicator configured that the UE has the rejected connection information to be reported, the network may request the UE to report the acquired rejected connection information indicator through transmission of a UE information request message.

The network may be operated to guarantee service quality required for the corresponding UE by using the received rejected connection information. For example, the network may be operated to provide the service to a UE that has experienced the rejected connection multiple times or for a long time preferentially to a UE that does not experience the rejected connection or provide a more improved service. According to the implementation, a rejected connection count limit and/or rejected connection timer limit value may be set in the network in order to prevent the UE from being continuously connection-denied and the network may be implemented to determine whether to permit the corresponding UE to access the network based on the values and the rejected connection information provided from the UE.

Meanwhile, when the rejected connection tolerance information indicating that delay tolerance is impossible is included in the rejected connection information provided by the UE, the determination of the network itself or contents of the rejected connection information may be preferred according to the implementation. When the rejected connection information is included according to the implementation, the determination of the network itself may be excluded.

Hereinafter, the exemplary embodiment of the present invention will be described in more detail with reference to the drawings.

Figure 9:
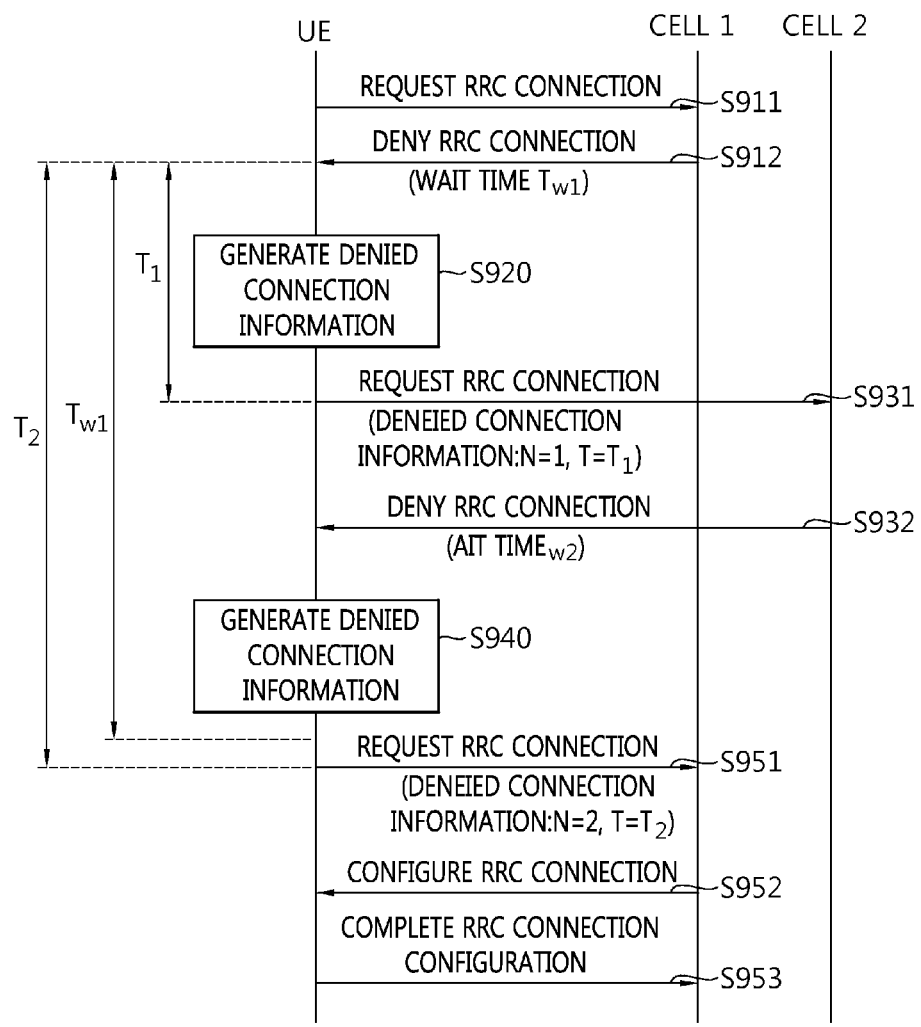
FIG. 9 is a flowchart illustrating one example of a method for reporting rejected connection information according to an exemplary embodiment of the present invention.

FIG. 9 is a flowchart illustrating one example of a method for reporting rejected connection information according to an exemplary embodiment of the present invention.

Referring to FIG. 9, the UE transmits the RRC connection request message to cell 1 for the RRC connection establishment (S911).

The connection establishment attempt of the UE through transmission of the RRC connection request message may be denied, and as a result, the UE receives the RRC connection reject message from cell 1 (S912). The RRC connection reject message may include the wait time information to exclude the UE to attempt the connection establishment to cell 1 during a specific time interval. The wait time information may indicate a wait time $T_{w1}$ which is a time interval when the UE is not permitted to perform an RRC connection establishment procedure to cell 1.

The UE that receives the RRC connection reject message generates the rejected connection information (S920). The UE may increase the rejected connection counter N and start the rejected connection timer T. The rejected connection information may include the rejected connection counter and the rejected connection timer. The rejected connection information may further include the wait time information associated with cell 1. The rejected connection information may further include other type information which may be included in the rejected connection information with reference to FIG. 8.

The UE may attempt the RRC connection establishment with cell 2 which is a target cell selected through a cell selection/reselection mechanism. To this end, the UE transmits the RRC connection request message to cell 2 (S931). The UE may transmit the rejected connection information included in the RRC connection request message. The rejected connection information may include the rejected connection counter and the rejected connection counter, N may be set to 1. The rejected connection information may include the rejected connection timer and the rejected connection timer may be set to a time $T_1$ calculated from the time when the previous connection establishment attempt is denied to the time when the UE transmits the RRC connection request message for attempting the connection establishment. The rejected connection information may further include the wait time information set to $T_{w1}$.

The connection establishment attempt of the UE through the transmission of the RRC connection request message may be denied, and as a result, the UE receives the RRC connection reject message from cell 2 (S932). The RRC connection reject message may include the wait time information to exclude the UE to attempt the connection establishment to cell 2 during a specific time interval. The wait time information may indicate a wait time $T_{w2}$ which is a time interval when the UE is not permitted to perform the RRC connection establishment procedure to cell 2.

The UE that receives the RRC connection reject message generates the rejected connection information (S940). The UE may increase the rejected connection counter N and start the rejected connection timer T. The rejected connection information may include the rejected connection counter and the rejected connection timer. The rejected connection information may further include the wait time information associated with cell 2. The rejected connection information may further include the wait time information associated with cell 1. The rejected connection information may further include other type information which may be included in the rejected connection information with reference to FIG. 8.

The UE may attempt the RRC connection establishment with cell 1 which is the target cell selected through the cell selection/reselection mechanism. In this case, after the wait time set with rejected connection of cell 1 is terminated, the UE may select cell 1 as the target cell. As a result, the UE transmits the RRC connection request message to cell 1 (S951). The UE may transmit the rejected connection information included in the RRC connection request message. The rejected connection information may include the rejected connection counter and the rejected connection counter, N may be set to 2. The rejected connection information may include the rejected connection timer and the rejected connection timer may be set to a time $T_2$ calculated from the time when an initial connection establishment attempt is denied to the time when the UE transmits the RRC connection request message for attempting the connection establishment to cell 1 again. The rejected connection information may further include the wait time information set to $T_{w1}$ and the wait time information set to $T_{w2}$.

The connection establishment attempt of the UE through the transmission of the RRC connection request message may be permitted, and as a result, the UE receives the RRC connection configuration message from cell 1 (S952). The UE may transmit the RRC connection configuration completion message to cell 1 in order to verify successful completion of the RRC connection establishment as a response to the RRC connection configuration message (S953).

The UE enters the RRC connection state through the RRC connection establishment procedure with cell 1 to discard the generated rejected connection information. The time when the UE discards the rejected connection information may be the time of receiving the RRC connection configuration message from cell 1 or the time when the UE transmits the RRC connection configuration completion message to cell 1.

Figure 10:
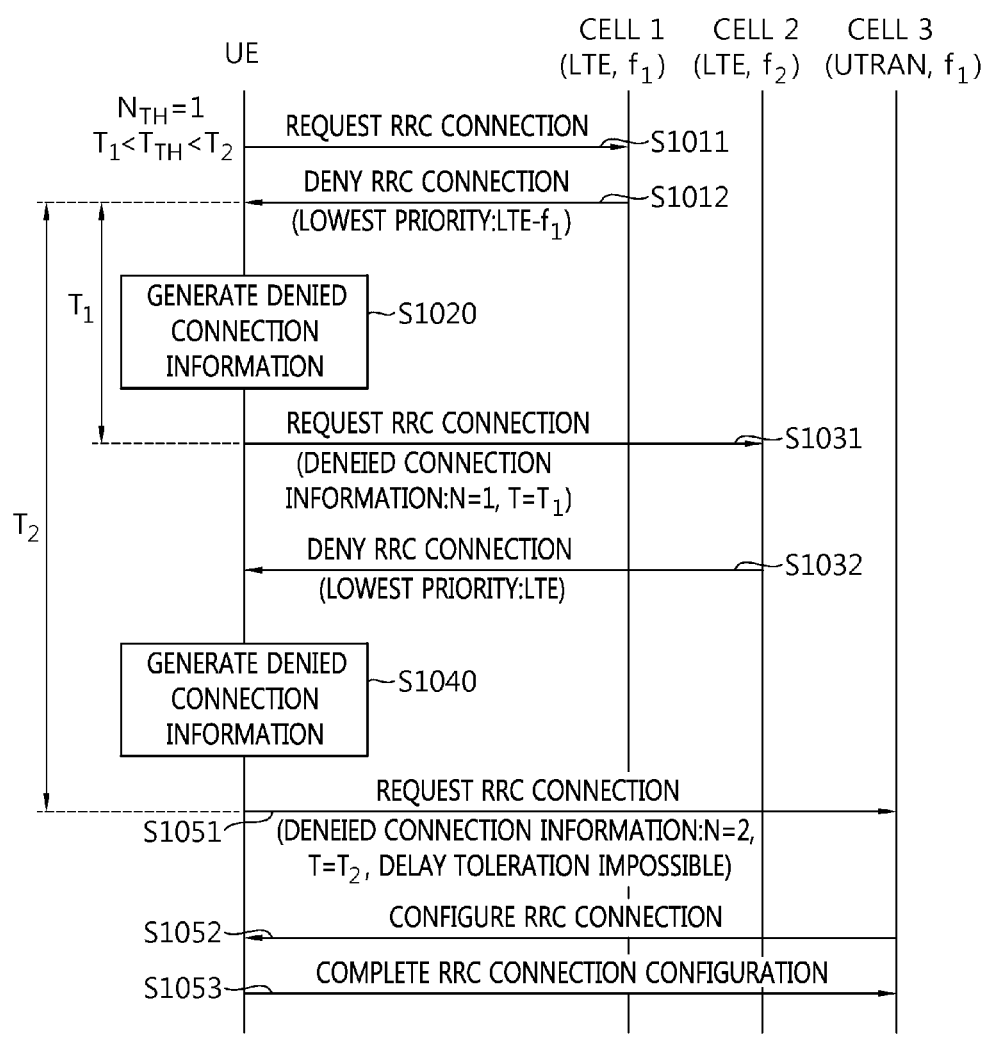
FIG. 10 is a diagram illustrating another example of the rejected connection information according to the exemplary embodiment of the present invention.

FIG. 10 is a diagram illustrating another example of the rejected connection information according to the exemplary embodiment of the present invention.

Referring to FIG. 10, it is assumed that cell 1 and cell 2 may be LTE type cells and cell 1 is operated at a frequency $f_1$ and cell 2 is operated at a frequency $f_2$. It is assumed that cell 3 is a UTRAN type cell and is operated at the frequency f1.

A rejected connection count threshold $N_{TH}$ and a rejected connection timer threshold $T_{TH}$ are configured in the UE. The rejected connection count value and the rejected connection timer threshold value may be configured by implementing the UE in advance or signaling from the network.

The UE transmits the RRC connection request message to cell 1 for the RRC connection establishment (S1011).

The connection establishment attempt of the UE through the transmission of the RRC connection request message may be denied, and as a result, the UE receives the RRC connection reject message from cell 1 (S1012). The RRC connection reject message may include lowest priority request information indicating the UE to be operated by applying the lowest priority to the cell operated at the frequency f1 of the LTE cell. Further, the lowest priority request information may further indicate a duration when the UE is operated by applying the lowest priority to the frequency f1 of the LTE.

The UE that receives the RRC connection reject message generates the rejected connection information (S1020). The UE may increase the rejected connection counter N and start the rejected connection timer T. The UE may determine whether the service delayed due to the rejected connection may be tolerated based on the rejected connection count, the rejected connection timer, the rejected connection count threshold, and the rejected connection timer threshold. When the current rejected connection counter value is more than the rejected connection count threshold and the current rejected connection timer value is more than the rejected connection timer threshold, the UE may determine whether the delayed service is not tolerated any longer. In the example, in step S1020, since the current rejected connection counter value is not more than $N_{TH}$ as N=1 and the current rejected connection timer value is not more than $T_{TH}$ as $T=T_1$, the UE may determine that the delayed service may still be tolerated.

The rejected connection information may include the rejected connection counter, the rejected connection timer, the rejected connection tolerance information, and the lowest priority information. Further, the rejected connection information may further include other type information which may be included in the rejected connection information with reference to FIG. 8.

The UE selects the target cell through the cell selection/reselection mechanism. The UE applies the lowest priority to the cell operated at f1 of the LTE type to perform the cell reselection. As a result, the UE may select cell 2 operated at f2 of the LTE type and attempt the RRC connection establishment with cell 2. To this end, the UE transmits the RRC connection request message to cell 2 (S1031). The UE may transmit the rejected connection information included in the RRC connection request message. The rejected connection counter included in the rejected connection information, N is set to 1 to indicate that the connection is denied once. The rejected connection timer included in the rejected connection information may indicate the time $T_1$ calculated from the time when the previous connection establishment attempt is denied to the time when the UE transmits the RRC connection request message for attempting the connection establishment. The rejected connection tolerance information included in the rejected connection information may indicate that the service delayed due to the subsequent rejected connection may be tolerated. The lowest priority information included in the rejected connection information may indicate that the lowest priority is applied to the frequency $f_1$ of the LTE.

The connection establishment attempt of the UE through the transmission of the RRC connection request message may be denied, and as a result, the UE receives the RRC connection reject message from cell 2 (S1032). The RRC connection reject message may include lowest priority request information indicating the UE to be operated by applying the lowest priority to the LTE type cell operated at all frequencies. Further, the lowest priority request information may further indicate a duration when the UE is operated by applying the lowest priority to all LTE type frequencies.

The UE that receives the RRC connection reject message generates the rejected connection information (S1040). The UE may increase the rejected connection counter N and start the rejected connection timer T. The UE may determine whether the service delayed due to the rejected connection may be tolerated based on the rejected connection count, the rejected connection timer, the rejected connection count threshold, and the rejected connection timer threshold. In the example, in step S1040, since the current rejected connection counter value is more than $N_{TH}$ as N=2 and the current rejected connection timer value is more than $T_{TH}$ as $T=T_2$, the UE may determine that the delayed service may not be tolerated.

The rejected connection information may include the rejected connection counter, the rejected connection timer, the rejected connection tolerance information, and the lowest priority information. Further, the rejected connection information may further include other type information which may be included in the rejected connection information with reference to FIG. 8.

The UE selects the target cell through the cell selection/reselection mechanism. The UE applies the lowest priority to all frequencies of the LTE type cell to perform the cell reselection. As a result, the UE may select UTRAN type cell 3 as the target cell and attempt the RRC connection establishment with cell 3. To this end, the UE transmits the RRC connection request message to cell 3 (S1051). The UE may transmit the rejected connection information included in the RRC connection request message. The rejected connection counter included in the rejected connection information, N is set to 2 to indicate that the connection is denied twice. The rejected connection timer included in the rejected connection information may indicate the time $T_2$ calculated from the time when the previous connection establishment attempt is denied to the time when the UE transmits the RRC connection request message for attempting the connection establishment. The rejected connection tolerance information included in the rejected connection information may indicate that the service delayed due to the subsequent rejected connection may be tolerated. The lowest priority information included in the rejected connection information may indicate that the lowest priority is applied to all frequencies of the LTE.

The connection establishment attempt of the UE through the transmission of the RRC connection request message may be permitted. In the example, as cell 3 acquires the rejected connection tolerance information indicating that the delayed service may not be tolerated, the RRC connection establishment request by the UE may be permitted if possible. As a result, the UE transmits the RRC connection configuration message to cell 3 (S1052). The UE may transmit the RRC connection configuration completion message to cell 3 in order to verify successful completion of the RRC connection establishment as a response to the RRC connection configuration message (S1053).

The UE enters the RRC connection state through the RRC connection establishment procedure with cell 3 to discard the generated rejected connection information. The time when the UE discards the rejected connection information may be the time of receiving the RRC connection configuration message from cell 3 or the time when the UE transmits the RRC connection configuration completion message to cell 3.

In the example of FIG. 10, at the time when the UE determines whether to tolerate the delayed service, when both the rejected connection counter and the rejected connection timer are more than the rejected connection count threshold and the rejected connection timer threshold, it is exemplified that tolerating the delayed service is impossible, but the present invention is not limited thereto. The UE may determine that it is impossible to tolerate the delayed service when at least one of two conditions is satisfied.

Figure 11:
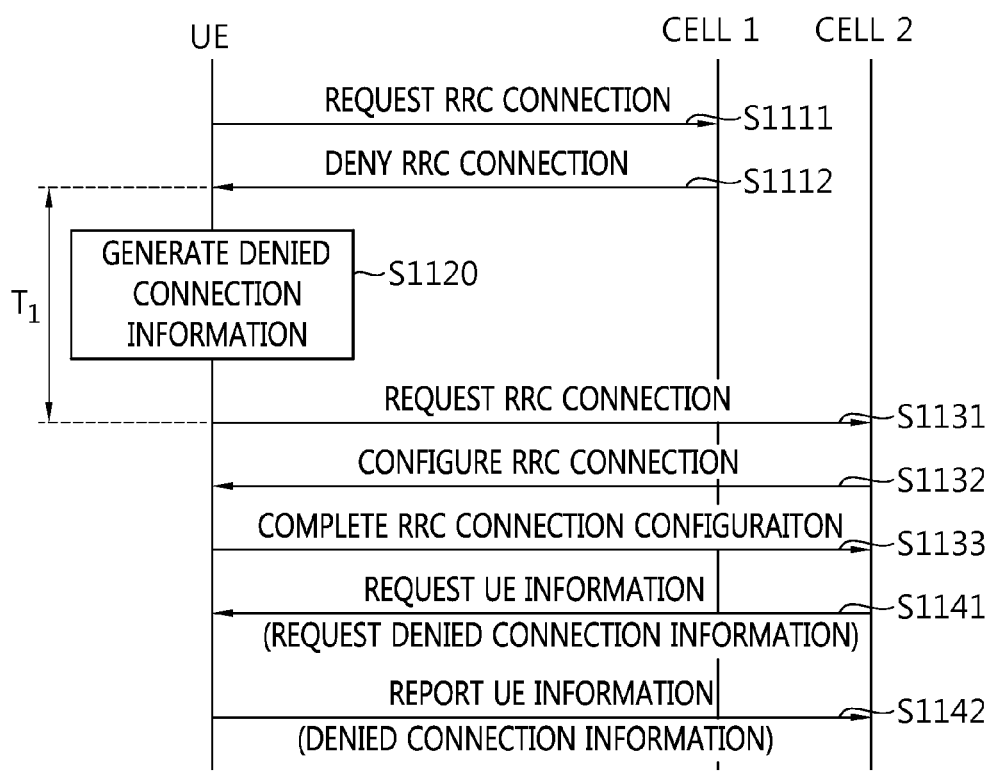
FIG. 11 is a flowchart illustrating yet another example of the method for reporting rejected connection information according to the exemplary embodiment of the present invention.

FIG. 11 is a flowchart illustrating yet another example of the method for reporting rejected connection information according to the exemplary embodiment of the present invention.

Referring to FIG. 11, the UE transmits the RRC connection request message to cell 1 for the RRC connection establishment (S1111).

The connection establishment attempt of the UE through the transmission of the RRC connection request message may be denied, and as a result, the UE receives the RRC connection reject message from cell 1 (S1112). The RRC connection reject message may include the wait time information to exclude the UE to attempt the connection establishment to cell 1 during a specific time interval. The wait time information may indicate a wait time which is a time interval when the UE is not permitted to perform the RRC connection establishment procedure to cell 1.

The UE that receives the RRC connection reject message generates the rejected connection information (S1120). The UE may increase the rejected connection counter N and start the rejected connection timer T. The rejected connection information may include the rejected connection counter and the rejected connection timer. The rejected connection information may further include the wait time information associated with cell 1. The rejected connection information may further include other type information which may be included in the rejected connection information with reference to FIG. 8.

The UE may attempt the RRC connection establishment with cell 2 which is a target cell selected through a cell selection/reselection mechanism. After the wait time set with the rejected connection of cell 1 is terminated, the UE may select cell 1 as the target cell, but in the example, it is assumed that cell 2 is selected as the target cell by the UE before the wait time is terminated. As a result, the UE transmits the RRC connection request message to cell 2 (S1131). The UE may transmit the rejected connection information included in the RRC connection request message. The rejected connection information may include the rejected connection counter and the rejected connection counter, N may be set to 1. The rejected connection information may include the rejected connection timer and the rejected connection timer may be set to a time $T_1$ calculated from the time when an initial connection establishment attempt is denied to the time when the UE transmits the RRC connection request message for attempting the connection establishment to cell 2 again.

The connection establishment attempt of the UE through the transmission of the RRC connection request message may be permitted, and as a result, the UE receives the RRC connection configuration message from cell 2 (S1132). The UE may transmit the RRC connection configuration completion message to cell 2 in order to verify successful completion of the RRC connection establishment as a response to the RRC connection configuration message (S1133).

The UE may receive the UE information report request message of the network after completing the RRC connection establishment procedure (S1141). The network may encapsulate a rejected connection information request indication in the UE information report request message in order to request the UE to report the rejected connection information.

The UE transmits the UE information report message to the network as a response to the UE information report request message (S1142). According to the rejected connection information request indication, the UE may transmit the generated rejected connection information included in the UE information report to the network. The UE may discard the rejected connection information after reporting the rejected connection information to the network through transmission of the UE information report message. When the rejected connection information is present even after the report, the UE may discard the existing rejected connection information when entering the RRC idle state again.

Meanwhile, the UE may include a rejected connection information indicator indicating that the RRC connection request message or the RRC connection configuration completion message includes rejected connection information to be reported. The network may transmit the UE information report request message including the rejected connection information request indication to correspond to the rejected connection information indicator transmitted by the UE.

Connection establishment is attempt, but a denied UE reports connection establishment denial information to the network. The network may be operated by reflecting connection establishment denial information provided from the UE to determining whether the subsequent connection establishment attempt is denied. Therefore, the connection establishment attempt of a specific UE can be prevented from being continuously denied, and as a result, service quality for the corresponding UE may be improved.

Figure 12:
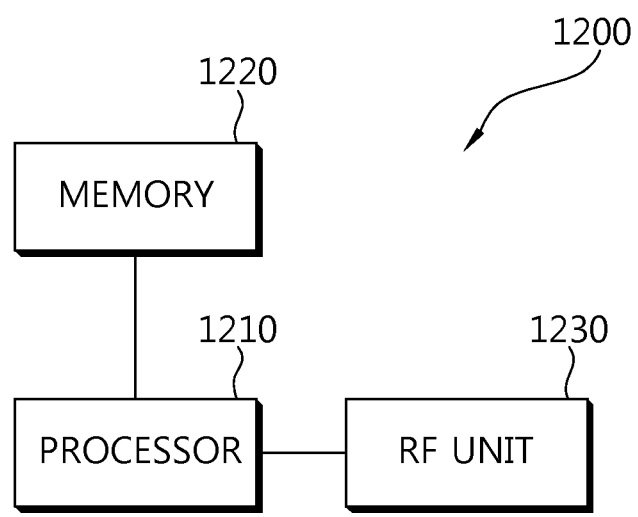
FIG. 12 is a block diagram illustrating a wireless device in which the exemplary embodiment of the present invention is implemented.

FIG. 12 is a block diagram illustrating a wireless device in which the exemplary embodiment of the present invention is implemented. This device may implement the UE and the network device that performs the method for reporting rejected connection information according to the exemplary embodiment of the present invention.

Referring to FIG. 12, the wireless device 1200 includes a processor 1210, a memory 1220, and a radio frequency (RF) unit 1230. The processor 1210 implements a function, a process, and/or a method which are proposed. The processor 1210 may be configured to the rejected connection information when the connection establishment attempt is rejected. The processor 1210 may be configured to report the rejected connection information during the RRC connection establishment procedure or after the RRC connection establishment completion. The reported rejected connection information may be an operation base for the network. The processor 1210 may be configured to implement the exemplary embodiment described with reference to FIGS. 8 to 11.

The RF unit 1230 is connected with the processor 1210 to transmit and receive a radio signal.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the exemplary embodiment is implemented by software, the aforementioned technique may be implemented by a module (a process, a function, and the like) performing the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for reporting rejected connection information in a wireless communication system, the method performed by a user equipment (UE) and comprising:
    receiving, from a first cell operating based on a first Radio Access Technology (RAT), a de-prioritization indicator and a connection reject message, wherein the de-prioritization indicator indicates whether an access priority of the first RAT is lower than an access priority of other RATs, and the connection reject message indicates that an attempt to establish a connection with the first cell has been rejected;
    generating the rejected connection information indicating that the attempt to establish the connection with the first cell has been rejected in response to the connection reject message; and
    reporting, to a second cell operating based on a second RAT different from the first RAT, the rejected connection information based on the de-prioritization indicator,
    wherein the rejected connection information includes a rejected connection timer which indicates a time interval since the attempt to establish the connection with the first cell has been rejected, and
    wherein if the de-prioritization indicator indicates that the access priority of the first RAT is lower than the access priority of the other RATs, the rejected connection information further includes a connection refusal tolerance information indicating that the second cell is not allowed to reject the attempt to establish the connection with the second cell.

2. The method of claim 1, wherein the rejected connection information is included in a radio resource control (RRC) connection request message when the UE performs the attempt to establish the connection again.

3. The method of claim 1, wherein the first RAT is a RAT on the basis of a long term evolution (LTE), and the second RAT is a RAT on the basis of a UMTS Terrestrial Radio Access Network (UTRAN).

4. The method of claim 1, wherein the rejected connection information further includes a rejected connection counter that indicates a number of rejections for the attempt to establish the connection.

5. The method of claim 4, further comprising:
    resetting the rejected connection counter when the connection establishment between the UE and the second cell is completed.

6. The method of claim 1, wherein when the time interval is more than a predetermined threshold, the connection refusal tolerance information indicates that the second cell is not allowed to reject the attempt to establish the connection with the second cell.

7. A user equipment (UE) comprising:
    a radio frequency (RF) unit that transmits or receives a radio signal; and
    a processor operably coupled with the RF unit,
    wherein the processor:
    receives, from a first cell operating based on a first Radio Access Technology (RAT), a de-prioritization indicator and a connection reject message, wherein the de-prioritization indicator indicates whether an access priority of the first RAT is lower than an access priority of other RATs, and the connection reject message indicates that an attempt to establish a connection with the first cell has been rejected,
    generates rejected connection information indicating that the attempt to establish the connection with the first cell has been rejected in response to the connection reject message, and
    reports, to a second cell operating based on a second RAT different from the first RAT, the rejected connection information based on the de-prioritization indicator,
    wherein the rejected connection information includes a rejected connection time which indicates a time interval since the attempt to establish the connection with the first cell has been rejected, and
    wherein if the de-prioritization indicator indicates that the access priority of the first RAT is lower than the access priority of the other RATs, the rejected connection information further includes a connection refusal tolerance information indicating that the second cell is not allowed to reject the attempt to establish the connection with the second cell.

* * * * *